(12) United States Patent
Sedarat

(10) Patent No.: US 9,374,257 B2
(45) Date of Patent: Jun. 21, 2016

(54) METHODS AND APPARATUSES OF MEASURING IMPULSE NOISE PARAMETERS IN MULTI-CARRIER COMMUNICATION SYSTEMS

(75) Inventor: Hossein Sedarat, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1836 days.

(21) Appl. No.: 11/377,114

(22) Filed: Mar. 15, 2006

(65) Prior Publication Data

US 2006/0253515 A1    Nov. 9, 2006

Related U.S. Application Data

(60) Provisional application No. 60/663,304, filed on Mar. 18, 2005.

(51) Int. Cl.
*H03D 1/04* (2006.01)
*H04L 27/26* (2006.01)

(52) U.S. Cl.
CPC ......... *H04L 27/2647* (2013.01); *H04L 27/2608* (2013.01)

(58) Field of Classification Search
USPC .......................................... 375/346
See application file for complete search history.

(56) References Cited

U.S. PATENT DOCUMENTS

| 4,009,371 | A | * | 2/1977 | Hamilton et al. ............... 377/52 |
| 4,024,359 | A | | 5/1977 | DeMarco et al. |
| 4,024,360 | A | | 5/1977 | Biraghi et al. |
| 4,173,714 | A | | 11/1979 | Bloch et al. |
| 4,384,355 | A | | 5/1983 | Werner |
| 4,679,227 | A | | 7/1987 | Hughes-Hartogs |
| 4,733,389 | A | | 3/1988 | Puvogel |
| 4,845,466 | A | | 7/1989 | Hariton et al. |
| 4,882,733 | A | | 11/1989 | Tanner |
| 4,977,591 | A | | 12/1990 | Chen et al. |
| 5,285,474 | A | | 2/1994 | Chow et al. |
| 5,304,940 | A | | 4/1994 | Harasawa et al. |
| 5,479,447 | A | | 12/1995 | Chow et al. |
| 5,483,551 | A | | 1/1996 | Huang et al. |
| 5,524,125 | A | | 6/1996 | Tsujimoto |
| 5,555,274 | A | | 9/1996 | Sheets |
| 5,559,890 | A | | 9/1996 | Obermeier et al. |

(Continued)

FOREIGN PATENT DOCUMENTS

| EP | 0 377 965 | 7/1989 |
| EP | 0 844 758 A2 | 5/1998 |

(Continued)

OTHER PUBLICATIONS

Thomas Starr, John M. Cioffi, Peter J. Silverman, Understanding Digital Subscriber Line Technology, 1999, pp. 94-97, 147-154, 206-217, 241-251, 330-331, Cover Page, Publication Page, Table of Contents. Prentice Hall PTR Upper Saddle River, NJ, 07458.

(Continued)

*Primary Examiner* — Lihong Yu
(74) *Attorney, Agent, or Firm* — Sterne, Kessler, Goldstein & Fox P.L.L.C.

(57) ABSTRACT

A method and apparatus for measuring and tracking Impulse Noise parameters in a communication system are described. The method includes estimating one or more parameters of the impulse noise, the parameters including a period, an offset and duration of the impulse noise.

19 Claims, 6 Drawing Sheets

(56) References Cited

U.S. PATENT DOCUMENTS

| | | | |
|---|---|---|---|
| 5,596,258 A | 1/1997 | Kimura et al. | |
| 5,596,439 A | 1/1997 | Dankberg et al. | |
| 5,627,859 A | 5/1997 | Parr | |
| 5,703,904 A * | 12/1997 | Langberg | 375/232 |
| 5,768,473 A | 6/1998 | Eatwell et al. | |
| 5,790,550 A | 8/1998 | Peeters et al. | |
| 5,815,538 A | 9/1998 | Grell et al. | |
| 5,818,872 A | 10/1998 | Gupta | |
| 5,844,940 A | 12/1998 | Goodson et al. | |
| 5,852,630 A | 12/1998 | Langberg et al. | |
| 5,867,539 A | 2/1999 | Koslov | |
| 5,901,205 A | 5/1999 | Smith et al. | |
| 5,909,178 A | 6/1999 | Balch et al. | |
| 5,930,268 A | 7/1999 | Kurby et al. | |
| 5,952,914 A | 9/1999 | Wynn | |
| 5,974,098 A | 10/1999 | Tsuda | |
| 5,978,373 A | 11/1999 | Hoff et al. | |
| 5,978,760 A * | 11/1999 | Rao et al. | 704/226 |
| 6,006,083 A | 12/1999 | Tong et al. | |
| 6,014,376 A | 1/2000 | Abreu et al. | |
| 6,052,420 A | 4/2000 | Yeap et al. | |
| 6,118,769 A | 9/2000 | Pries et al. | |
| 6,147,963 A | 11/2000 | Walker et al. | |
| 6,161,209 A | 12/2000 | Moher | |
| 6,185,429 B1 | 2/2001 | Gehrke et al. | |
| 6,205,220 B1 | 3/2001 | Jacobsen et al. | |
| 6,205,410 B1 * | 3/2001 | Cai | 702/191 |
| 6,212,227 B1 | 4/2001 | Ko et al. | |
| 6,226,322 B1 | 5/2001 | Mukherjee | |
| 6,256,326 B1 | 7/2001 | Kudo | |
| 6,266,347 B1 | 7/2001 | Amrany et al. | |
| 6,266,422 B1 | 7/2001 | Ikeda | |
| 6,295,323 B1 | 9/2001 | Gabara | |
| 6,330,275 B1 | 12/2001 | Bremer | |
| 6,345,071 B1 | 2/2002 | Hamdi | |
| 6,351,509 B1 | 2/2002 | Vitenberg et al. | |
| 6,359,926 B1 | 3/2002 | Isaksson et al. | |
| 6,363,109 B1 | 3/2002 | Polley et al. | |
| 6,378,234 B1 * | 4/2002 | Luo | 341/22 |
| 6,396,827 B1 * | 5/2002 | Paivike et al. | 370/347 |
| 6,411,657 B1 | 6/2002 | Verbin et al. | |
| 6,433,819 B1 | 8/2002 | Li et al. | |
| 6,445,773 B1 | 9/2002 | Liang et al. | |
| 6,456,673 B1 | 9/2002 | Wiesc et al. | |
| 6,459,739 B1 | 10/2002 | Vitenberg | |
| 6,466,588 B1 | 10/2002 | Michaels | |
| 6,493,395 B1 | 12/2002 | Isaksson et al. | |
| 6,498,808 B1 | 12/2002 | Tzannes | |
| 6,507,608 B1 | 1/2003 | Norrell | |
| 6,519,291 B1 | 2/2003 | Dagdeviren et al. | |
| 6,542,028 B1 | 4/2003 | Norrell et al. | |
| 6,546,025 B1 | 4/2003 | Dupuy | |
| 6,556,635 B1 | 4/2003 | Dehghan | |
| 6,597,732 B1 | 7/2003 | Dowling | |
| 6,608,864 B1 | 8/2003 | Strait | |
| 6,621,346 B1 | 9/2003 | Nabicht et al. | |
| 6,631,175 B2 | 10/2003 | Harikumar et al. | |
| 6,633,545 B1 | 10/2003 | Milbrandt | |
| 6,647,070 B1 | 11/2003 | Shalvi et al. | |
| 6,674,795 B1 | 1/2004 | Liu et al. | |
| 6,690,666 B1 | 2/2004 | Norrell et al. | |
| 6,721,394 B1 | 4/2004 | Murphy et al. | |
| 6,731,914 B2 | 5/2004 | Creigh et al. | |
| 6,738,418 B1 | 5/2004 | Stiscia et al. | |
| 6,754,170 B1 | 6/2004 | Ward | |
| 6,763,061 B1 | 7/2004 | Strait et al. | |
| 6,775,241 B1 | 8/2004 | Levin | |
| 6,791,995 B1 | 9/2004 | Azenkot et al. | |
| 6,798,735 B1 | 9/2004 | Tzannes et al. | |
| 6,822,998 B1 | 11/2004 | Yun et al. | |
| 6,826,404 B2 | 11/2004 | Delfs et al. | |
| 6,839,429 B1 | 1/2005 | Gaikwad et al. | |
| 6,859,488 B2 | 2/2005 | Azenkot et al. | |
| 6,871,066 B1 | 3/2005 | Khullar et al. | |
| 6,888,497 B2 | 5/2005 | King et al. | |
| 6,898,236 B1 | 5/2005 | Sun | |
| 6,934,345 B2 | 8/2005 | Chu et al. | |
| 6,940,973 B1 | 9/2005 | Yeap et al. | |
| 6,965,636 B1 | 11/2005 | DesJardins et al. | |
| 6,999,504 B1 | 2/2006 | Amrany et al. | |
| 6,999,507 B2 | 2/2006 | Jin | |
| 7,023,910 B1 | 4/2006 | Norrell | |
| 7,031,669 B2 | 4/2006 | Vaidyanathan et al. | |
| 7,035,661 B1 | 4/2006 | Yun | |
| 7,085,315 B1 | 8/2006 | Kelton | |
| 7,085,539 B2 | 8/2006 | Furman | |
| 7,120,211 B2 | 10/2006 | Shmulyian et al. | |
| 7,155,007 B1 | 12/2006 | Upton | |
| 7,174,022 B1 | 2/2007 | Zhang et al. | |
| 7,177,419 B2 | 2/2007 | Sedarat et al. | |
| 7,184,467 B2 | 2/2007 | Jacobsen et al. | |
| 7,200,196 B2 | 4/2007 | Li et al. | |
| 7,215,727 B2 * | 5/2007 | Yousef et al. | 375/376 |
| 7,221,722 B2 | 5/2007 | Thomas et al. | |
| 7,240,252 B1 * | 7/2007 | Fessler et al. | 714/712 |
| 7,260,117 B2 | 8/2007 | Long et al. | |
| 7,283,509 B2 | 10/2007 | Moon et al. | |
| 7,283,598 B2 | 10/2007 | Akita et al. | |
| 7,302,379 B2 | 11/2007 | Cioffi et al. | |
| 7,315,592 B2 | 1/2008 | Tsatsanis et al. | |
| 7,315,967 B2 * | 1/2008 | Azenko et al. | 714/704 |
| 7,330,544 B2 | 2/2008 | D'Angelo et al. | |
| 7,356,049 B1 | 4/2008 | Rezvani | |
| 7,366,258 B2 | 4/2008 | Kolze et al. | |
| 7,369,607 B2 | 5/2008 | Sedarat | |
| 7,421,015 B2 | 9/2008 | Sedarat | |
| 7,433,395 B2 | 10/2008 | Sedarat | |
| 7,443,916 B2 | 10/2008 | Sedarat et al. | |
| 7,502,336 B2 | 3/2009 | Romano et al. | |
| 7,529,984 B2 | 5/2009 | Hcisc | |
| 7,555,037 B2 | 6/2009 | Sedarat | |
| 7,630,489 B2 | 12/2009 | Oksman et al. | |
| 7,773,666 B2 | 8/2010 | Belge et al. | |
| 7,813,439 B2 | 10/2010 | Norrell et al. | |
| 7,822,005 B2 | 10/2010 | Ptasinski et al. | |
| 7,852,950 B2 | 12/2010 | Sedarat | |
| 7,953,163 B2 | 5/2011 | Wiese | |
| 8,194,722 B2 | 6/2012 | Norrell | |
| 8,340,279 B2 | 12/2012 | Jagannathan et al. | |
| 8,605,837 B2 | 12/2013 | Wiese et al. | |
| 9,160,381 B2 | 10/2015 | Wiese et al. | |
| 2001/0009850 A1 | 7/2001 | Kushige | |
| 2001/0011019 A1 | 8/2001 | Jokimies | |
| 2001/0055332 A1 | 12/2001 | Sadjadpour et al. | |
| 2002/0001340 A1 | 1/2002 | Shenoi et al. | |
| 2002/0044597 A1 | 4/2002 | Shively et al. | |
| 2002/0057713 A1 | 5/2002 | Bagchi et al. | |
| 2002/0078247 A1 | 6/2002 | Lu et al. | |
| 2002/0080862 A1 | 6/2002 | Ali | |
| 2002/0122515 A1 * | 9/2002 | Bodenschatz | 375/354 |
| 2002/0154620 A1 | 10/2002 | Azenkot et al. | |
| 2002/0163959 A1 | 11/2002 | Haddad | |
| 2003/0021240 A1 | 1/2003 | Moon et al. | |
| 2003/0035469 A1 | 2/2003 | Frank et al. | |
| 2003/0043925 A1 | 3/2003 | Stopler et al. | |
| 2003/0048368 A1 | 3/2003 | Bosco et al. | |
| 2003/0055996 A1 | 3/2003 | Mori et al. | |
| 2003/0091053 A1 | 5/2003 | Tzannes et al. | |
| 2003/0099285 A1 | 5/2003 | Graziano et al. | |
| 2003/0099286 A1 | 5/2003 | Graziano et al. | |
| 2003/0099287 A1 | 5/2003 | Arambepola | |
| 2003/0099350 A1 | 5/2003 | Bostoen et al. | |
| 2003/0108094 A1 | 6/2003 | Lai et al. | |
| 2003/0112860 A1 | 6/2003 | Erdogan | |
| 2003/0112887 A1 | 6/2003 | Sang et al. | |
| 2003/0124983 A1 | 7/2003 | Parssinen et al. | |
| 2003/0185176 A1 | 10/2003 | Lusky et al. | |
| 2003/0206579 A1 | 11/2003 | Bryant | |
| 2003/0227967 A1 | 12/2003 | Wang et al. | |
| 2004/0057502 A1 | 3/2004 | Azenkot et al. | |
| 2004/0066865 A1 | 4/2004 | Yousef et al. | |
| 2004/0071240 A1 | 4/2004 | Betts | |
| 2004/0085987 A1 | 5/2004 | Gross et al. | |
| 2004/0087278 A1 | 5/2004 | Lin et al. | |

(56) References Cited

U.S. PATENT DOCUMENTS

| | | | |
|---|---|---|---|
| 2004/0091025 A1 | 5/2004 | Sindhushayana et al. |
| 2004/0111345 A1 | 6/2004 | Chuang et al. |
| 2004/0125015 A1 | 7/2004 | King et al. |
| 2004/0141548 A1 | 7/2004 | Shattil |
| 2004/0156441 A1 | 8/2004 | Peeters et al. |
| 2004/0176063 A1 | 9/2004 | Choi |
| 2004/0185852 A1 | 9/2004 | Son et al. |
| 2004/0213170 A1 | 10/2004 | Bremer |
| 2004/0223449 A1 | 11/2004 | Tsuie et al. |
| 2005/0041753 A1 | 2/2005 | Cunningham |
| 2005/0047489 A1 | 3/2005 | Yousef et al. |
| 2005/0047514 A1 | 3/2005 | Bolinth et al. |
| 2005/0053229 A1 | 3/2005 | Tsatsanis et al. |
| 2005/0094550 A1 | 5/2005 | Huh et al. |
| 2005/0099967 A1 | 5/2005 | Baba |
| 2005/0111561 A1 | 5/2005 | Sedarat et al. |
| 2005/0143008 A1 | 6/2005 | Bailey |
| 2005/0159128 A1 | 7/2005 | Collins et al. |
| 2005/0169357 A1 | 8/2005 | Sedarat |
| 2005/0190825 A1 | 9/2005 | Sedarat |
| 2005/0190848 A1 | 9/2005 | Kiyanagii et al. |
| 2005/0190871 A1 | 9/2005 | Sedarat |
| 2005/0216441 A1 | 9/2005 | Thomas et al. |
| 2005/0271129 A1 | 12/2005 | Reina |
| 2005/0276355 A1 | 12/2005 | Chow et al. |
| 2006/0002457 A1 | 1/2006 | Romano et al. |
| 2006/0019687 A1 | 1/2006 | Garg et al. |
| 2006/0039550 A1 | 2/2006 | Chadha et al. |
| 2006/0056305 A1 | 3/2006 | Oksman et al. |
| 2006/0062379 A1 | 3/2006 | Sedarat et al. |
| 2006/0067388 A1 | 3/2006 | Sedarat et al. |
| 2006/0078044 A1 | 4/2006 | Norrell et al. |
| 2006/0083321 A1 | 4/2006 | Sedarat |
| 2006/0083322 A1 | 4/2006 | DesJardins et al. |
| 2006/0083323 A1 | 4/2006 | DesJardins et al. |
| 2006/0083324 A1 | 4/2006 | DesJardins et al. |
| 2006/0115030 A1 | 6/2006 | Erving et al. |
| 2006/0126747 A1 | 6/2006 | Wiese |
| 2006/0171480 A1 | 8/2006 | Erving et al. |
| 2006/0193390 A1 | 8/2006 | Sedarat |
| 2006/0203843 A1 | 9/2006 | Liu |
| 2006/0222098 A1 | 10/2006 | Sedarat et al. |
| 2006/0227913 A1 | 10/2006 | Sedarat |
| 2006/0291537 A1 | 12/2006 | Fullerton et al. |
| 2007/0002940 A1 | 1/2007 | Zhou |
| 2007/0183526 A1 | 8/2007 | Norrell et al. |
| 2007/0217492 A1 | 9/2007 | Cox et al. |
| 2008/0232444 A1 | 9/2008 | Tzannes |
| 2008/0317110 A1 | 12/2008 | Sedarat |
| 2010/0091827 A1 | 4/2010 | Wiese et al. |
| 2011/0206104 A1 | 8/2011 | Wiese et al. |

FOREIGN PATENT DOCUMENTS

| | | |
|---|---|---|
| EP | 0 966 134 A2 | 12/1999 |
| EP | 1 389 846 A2 | 2/2004 |
| EP | 1 388 944 A1 | 4/2004 |
| WO | WO 2006/042274 A1 | 4/2006 |
| WO | WO 2010/042350 A1 | 4/2010 |

OTHER PUBLICATIONS

PCT Search Report, International Application No. PCT/US06/10004, International Filing Date Mar. 16, 2006, Mailed Oct. 10, 2007.

PCT Written Opinion of the International Searching Authority, International Application No. PCT/US06/10004, International Filing Date Mar. 16, 2006, Mailed Oct. 10, 2007.

Ahmed, Nadeem, et al., "Optimal Transmit Spectra for Communication in the Presence of Crosstalk and Imperfect Echo Cancellation," IEEE, p. 17-21, © 2001.

Al-Dhahir, Naofal, et al., "Optimum Finite-Length Equalization for Multicarrier Transceivers," IEEE vol. 44, No. 1, p. 56-64, Jan. 1996.

Armada, Ana Garcia, et al., "Mulit-User Constant-Energy Bit Loading for M-PSK-Modulated Orthogonal Frequency Division Multiplexing," IEEE, p. 526-530, © 2002.

Arslan, G., et al., "Equalization for Discrete Multitone Transceivers to Maximize Bit Rate," IEEE, vol. 49, No. 12, p. 3123-3135, Dec. 2001.

Baccarelli, Enzo, et al., Novel Efficient Bit-Loading Algorithms for Peak-Energy Limited ADSL-Type Multicarrier Systems, IEEE Trans on Signal Processing, vol. 50, No. 5, May 2002.

Barreto, Andre Noll, et al., "Adaptive Bit Loading for Wireless OFDM Systems," IEEE International Symposium on Personal, Indoor, and Mobile Radio Communications, Oct. 2001.

Bingham, John A.C., et al., "Multicarrier Modulation for Data Transmission: An Idea Whose Time Has Come," IEEE, p. 5-14, May 1990.

Blahut, Richard E., "Theory and Practice of Error Control Codes," Chapter 7: Bose-Chaudhuri-Hocquenghem Codes, 1984.

Blahut, Richard E., "Theory and Practice of Error Control Codes," Chapter 11: Fast Algorithms, 1984.

Campello, Jorge, "Optimal Discrete Bit Loading for Multicarrier Modulation Systems," IEEE International Symposium on Information Theory, Cambridge, MA, Aug. 1998.

Chow, Peter S., et al., "A Practical Discrete Multitone Transceiver Loading Algorithm for Data Transmission Over Spectrally Shaped Channels," IEEE Trans. on Communications, vol. 43, No. 2, 1995.

Cioffi, J. ct al., "Analog RF Cancclation with SDMT (96-084)," T1E1.4/96-084 contribution, Amati Communications Corporation, Apr. 22, 1996.

Cioffi, J.M. et al., "Generalized Decision-Feedback Equalization for Packet Transmission with ISI and Gaussian Noise," In Communications, Computation, Control, and Signal Processing, a tribute to Thomas Kailath, Kluwer Academic Publishers, p. 79-127, 1997.

Communication pursuant to Article 94(3), EPC, 05806662.2-1525, Ref. W3477002EPPWOSv, 4 pages, dated Feb. 26, 2008.

Communication pursuant to Rules 109 and 110 EPC, 05806662.2-1525, PCT/US2005/036655, W3477002EPPWOSv, 2 pages, dated May 21, 2007.

"Draft Standard," Network and Customer Installation Interfaces—Asymmetric Digital Subscriber Line (ADSL) Metallic Interface, Draft American National Standard for Telecommunications, Alliance for Telecommunications Industry Solutions, T1. 413, 1998.

Farhang-Boroujeny, Behrouz, et al., "Design Methods for Time-Domain Equalizers in DMT Transceivers," IEEE, vol. 49, No. 3, p. 554-562, Mar. 2001.

Fischer, Robert F.H., et al., "A New Loading Algorithm for Discrete Multitone Transmission," IEEE, p. 724-728, 1996.

Franklin, Curt, "How DSL Works," How Stuff Works, http://computer.howstuffworks.com/dsl.htm/printable, printed Nov. 16, 2004.

Henkel, Werner, et al., "Maximizing the Channel Capacity of Multicarrier Transmission by Suitable Adaptation of the Time-Domain Equalizer," IEEE, vol. 48, No. 12, Dec. 2000.

International Preliminary Report on Patentability, PCT/US2005/023634 filed Jun. 30, 2005, mailed Jan. 18, 2007.

International Preliminary Report on Patentability (Chapter 1), International Application No. PCT/US2005/036655, filed Oct. 11, 2005, mailed Apr. 11, 2007.

International Preliminary Report on Patentability, International Application No. PCT/US2007/001997, filed Jan. 25, 2007, mailed Aug. 21, 2008.

International Telecommunication Union (ITU) Recommendation G.992.1, "Asymmetric digital subscriber line (ADSL) transceivers," Series G: Transmission Systems and Media, Digital Systems and Networks, Jun. 1999.

International Telecommunication Union (ITU) Recommendation G.992.3, "Asymmetric digital subscriber line transceivers -2 (ASDL 2), Series G: Transmission Systems and Media, Digital Systems and Networks," Jul. 2002.

International Telecommunication Union (ITU) Recommendation G.993.1, "Very high speed digital subscriber line (VDSL)," Series G: Transmission Systems and Media, Digital Systems and Networks, Jun. 2004.

International Telecommunication Union (ITU) Recommendation G.992.2, "Splitterless asymmetric digital subscriber line (ADSL)

(56) References Cited

OTHER PUBLICATIONS transceivers," Series G: Transmission Systems and Media, Digital Systems and Networks, Jun. 1999.

Kamkar-Parsi et al., Wideband Crosstalk Interface Cancelling on xDSL Using Adaptive Signal Processing and Common Mode Signal, IEEE, p. IV-1045-IV-1048, 2004.

Karp et al., Zero-forcing frequency domain equalization for DMT systems with insufficient guard interval, IEEE ICASSP, p. 221-224, 2003.

Krongold, Brian S., et al., "Computationally Efficient Optimal Power Allocation Algorithms for Multicarrier Communications Systems," IEEE Trans. on Communications, vol. 48, p. 23-27, Jan. 2000.

Lampe, Lutz H.J., et al., "Performance Evaluation of Non-Coherent Transmission Over Power Lines," 8 pages, 2007.

Lashkarian, Navid, et al., Fast Algorithm for Finite-Length MMSE Equalizers with Application to Discrete Multitone Systems, IEEE, p. 2753-2756, 1999.

Leke, Achankeng et al., "A Maximum Rate Loading Algorithm for Discrete Multitone Modulation Systems," IEEE, p. 1514-1518, 1997.

Magesacher, Thomas et al., "Adaptive Interference Cancellation Using Common-Mode Information in DSL," Proceedings of European Signal Processing Conference 2005, Sep. 2005.

Magesacher, Thomas et al., "Analysis of Adaptive Interference Cancellation Using Common-Mode Information in Wireline Communications," EURSASIO Journal on Advances in Signal Processing, vol. 2007, Article 84956, Jun. 2007.

Magesacher, Thomas et al., "Information Rate Bounds in Commoon-Mode Aided Wireline Communications," European Transactions on Telecommunications, vol. 17, No. 5, p. 533-545, Oct. 2006.

Melsa, Peter J.W., et al., "Impulse Response Shortening for Discrete Multitone Transceivers," IEEE vol. 44, No. 12, p. 1662-1672, Dec. 1996.

Milosevic et al., "Simultaneous Multichannel Time Domain Equalizer Design Based on the Maximum Composite Shortening SNR," Dept. of Electrical and Compter Eng., The University of Texas, Austin, Texas, 5 pages, 2002.

Misao, Fukuda et all, "A Line Terminating LSI Using Echo Cancelling Method for ISDN Subscriber Loop Transmission," IEEE Journal on Selected Areas in Communications, vol. 6, No. 3, p. 476-483, Apr. 1988.

Okamura, Yasuka et al., "ADSL System for Time Periodic Noise Environments," XP-00086790, NEC Res. & Develop., vol. 40, No. 1, p. 64-69, Jan. 1999.

PCT Search Report and Written Opinion of the International Searching Authority, International Application No. PCT/US05/23634, International filing date Jun. 30, 2005, mailed May 4, 2006.

PCT Search Report and Written Opinion of the International Searching Authority, International Application No. PCT/US2005/036655, International filing date Oct. 11, 2005, mailed Feb. 14, 2006.

PCT Search Report and Written Opinion of the International Searching Authority from the International Searching Authority, International Application No. PCT/US2007/001997, International filing date Jan. 25, 2007, mailed Jul. 18, 2007.

PCT Search Report and Written Opinion of the International Searching Authority from the International Searching Authority, International Application No. PCT/US06/09687, International Filing Date Mar. 16, 2006, Mailed Nov. 16, 2007.

PCT Search Report and Written Opinion of the International Searching Authority from the International Searching Authority, International Application No. PCT/US06/09804, Filing Date Mar. 17, 2006, Mailed Apr. 2, 2008.

PCT Search Report and Written Opinion of the International Searching Authority from the International Searching Authority, International Application No. PCT/US09/58821, Filing Date Sep. 29, 2009, Mailed Dec. 2, 2009.

Perez-Alvarez, Ivan A., et al., "A Differential Error Reference Adaptive Echo Canceller for Multilevel PAM Line Codes," Work supported by National Project T1C95-0026, IEEE, p. 1707-1710, © 1996.

Sedarat, Hossein, et al., "Impulse Noise Protection for Multi-Carrier Communication Systems," submitted to IEEE ICASSP, 2005.

Sedarat, Hossein, et al., "Multicarrier Bit-Loading in Presence of Biased Gaussian Noise Sources," IEEE Consumer Communication and Networking Conference, Jan. 2005.

Sonalkar, Ranjan, et al., "An Efficient Bit-Loading Algorithm for DMT Application," IEEE Comm. Letters, vol. 4, p. 80-82, Mar. 2000.

Sonalkar, Ranjan, et al., "Shannon Capacity of Frequency-Overlapped Digital Subscriber Loop Channels," IEEE, p. 1741-1745, © 2002.

STLC60134S: TOSCA Integrated ADSL. CMOS Analog Front-End Circuit, Aug. 1999.

Toumpakaris, D. "A byte-erasure method for improved impulse immunity in DSL systems using soft information from an inner code," IEEE International Conference on Communications (ICC), vol. 4, p. 2431-2435, May 2003.

Toumpakaris, D., "A Square Distance-Based Byte-Erasure Method for Reduced-delay Protection of DSL Systems from Non-stationary Interference," IEEE International Conference on Communications (ICC), Vo. 4, p. 2114-2119, San Francisco, CA, Dec. 2003.

Toumpakaris, D., "Reduced Delay Protection of DSL Systems Against Nonstationary Disturbances," IEEE Trans. Communications, vol. 52, No. 11, Nov. 2004.

Wu, Cheng-Shing, et al., "A Novel Cost-Effective Multi-Path Adaptive Interpolated FIR (IFIR)-Based Echo Canceller," IEEE, p. V-453-V-456, © 2000.

Wyglinski, Alexander M., et al., "An Efficient Bit Allocation for Multicarrier Modulation," IEEE Wireless Communication, Networking Conference, Atlanta, GA, 4 pages, Mar. 2004.

Zogakis, T.N., et al., "Impulse Noise Mitigation Strategies for Multicarrier Modulation," Proceedings of the International Conference on Communications (ICC), vol. 3, p. 784-788, May 23, 1993.

Final Office Action dated Apr. 29, 2008, U.S. Appl. No. 11/067,434, filed Feb. 25, 2005, Sedarat.

Non-Final Office Action dated Oct. 30, 2007, U.S. Appl. No. 11/067,434, filed Feb. 25, 2005, Sedarat.

Non-Final Office Action dated Jul. 21, 2008, U.S. Appl. No. 11/067,434, filed Feb. 25, 2005, Sedarat.

Non-Final Office Action dated Jan. 6, 2009, U.S. Appl. No. 11/067,434, filed Feb. 25, 2005, Sedarat.

Non-Final Office Action dated Aug. 19, 2009, U.S. Appl. No. 11/067,434, filed Feb. 25, 2005, Sedarat.

Non-Final Office Action dated May 16, 2008, U.S. Appl. No. 11/131,392, filed May 16, 2008, Wiese.

Non-Final Office Action dated Dec. 10, 2008, U.S. Appl. No. 11/131,392, filed May 16, 2008, Wiese.

Non-Final Office Action dated Jun. 9, 2009, U.S. Appl. No. 11/131,392, filed May 16, 2008, Wiese.

Non-Final Office Action dated Aug. 21, 2008, U.S. Appl. No. 11/248,704, filed Oct. 11, 2005, Norrell et al.

Non-Final Office Action dated Feb. 4, 2009, U.S. Appl. No. 11/248,704, filed Oct. 11, 2005, Norrell et al.

Final Office Action dated Aug. 5, 2009, U.S. Appl. No. 11/248,704, filed Oct. 11, 2005, Norrell et al.

Non-Final Office Action dated Nov. 26, 2008, U.S. Appl. No. 11/348,733, filed Feb. 6, 2006, Norrell el al.

Non-Final Office Action dated Apr. 8, 2009, U.S. Appl. No. 11/348,733, filed Feb. 6, 2006, Norrell et al.

Non-Final Office Action dated Oct. 23, 2009, U.S. Appl. No. 11/348,733, filed Feb. 6, 2006, Norrell et al.

Non-Final Office Action dated Nov. 9, 2007, U.S. Appl. No. 11/377,083, filed Mar. 15, 2006, Sedarat.

Non-Final Office Action dated May 19, 2008, U.S. Appl. No. 11/377,083, filed Mar. 15, 2006, Sedarat.

Notice of Allowance dated May 18, 2009, U.S. Appl. No. 11/377,083, filed Mar. 15, 2006, Sedarat.

Final Office Action dated Dec. 4, 2008, U.S. Appl. No. 11/377,083, filed Mar. 15, 2006, Sedarat.

Non-Final Office Action dated Dec. 11, 2008, U.S. Appl. No. 11/377,084, filed Mar. 15, 2006, Sedarat et al.

Non-Final Office Action dated Aug. 4, 2009, U.S. Appl. No. 11/377,084, filed Mar. 15, 2006, Sedarat et al.

(56) References Cited

OTHER PUBLICATIONS

Magesacher, Thomas. et al., "On the Capacity of the Copper Cable Channel Using the Common Mode", Proc. Of the Global Telecommunications Conference, Taipei, Taiwan, vol. 2, Nov. 2002, pp. 1269-1273.
Yeap, T. H. et al., "Novel Common Mode Noise Cancellation Techniques for xDSL Applications", Proc. of IEEE Instrumentation and Measurement Technology Conference, Anchorage, AK, May 2002, pp. 1125-1128.
Extended European Search Report directed to related European Patent Application No. 06738974.2, mailed Feb. 5, 2013; 8 pages.
"VDSL2: Multi-Rate Impulse Protection; HH081," ITU-T Drafts, Study Period 2005-2008, International Telecommunication Union, Geneva, CH, Jan. 17, 2005; pp. 1-4.
Final Office Action dated May 27, 2010, U.S. Appl. No. 11/067,434, filed Feb. 25, 2005, Sedarat.
Notice of Allowance dated Sep. 15, 2010, U.S. Appl. No. 11/067,434, filed Feb. 25, 2005, Sedarat.
Non-Final Office Action dated Jul. 14, 2010, U.S. Appl. No. 11/131,392, filed May 16, 2005, Wiese.
Non-Final Office Action dated Jun. 14, 2010, U.S. Appl. No. 11/248,704, filed Oct. 11, 2005, Norrell et al.
Final Office Action dated Dec. 6, 2010, U.S. Appl. No. 11/248,704, filed Oct. 11, 2005, Norrell et al.
Non-Final Office Action dated Apr. 14, 2011, U.S. Appl. No. 11/248,704, filed Oct. 11, 2005, Norrell et al.
Non-Final Office Action dated Oct. 26, 2011, U.S. Appl. No. 11/248,704, filed Oct. 11, 2005, Norrell et al.
Notice of Allowance dated Apr. 29, 2010, U.S. Appl. No. 11/348,733, filed Feb. 6, 2006, Norrell et al.
Final Office Action dated Jul. 8, 2010, U.S. Appl. No. 11/377,084, filed Mar. 15, 2006, Sedarat et al.
Non-Final Office Action dated Aug. 16, 2011, U.S. Appl. No. 12/287,577, filed Oct. 10, 2008, Wiese et al.
Notice of Allowance dated Nov. 15, 2011, U.S. Appl. No. 12/287,577, filed Oct. 10, 2008, Wiese et al.
Non-Final Office Action dated Oct. 4, 2012, U.S. Appl. No. 13/098,891, filed May 2, 2011, Wiese et al.
Notice of Allowance dated Feb. 21, 2013, U.S. Appl. No. 13/098,891, filed. May 2, 2011, Wiese et al.
Notice of Allowance dated Aug. 7, 2013, U.S. Appl. No. 12/287,577, filed Oct. 10, 2008, Wiese et al.
Non-Final Office Action dated Nov. 4, 2014, U.S. Appl. No. 14/099,763, filed Dec. 6, 2013, Weise, et al.
Final Office Action dated Mar. 2, 2015, U.S. Appl. No. 14/099,763, filed Dec. 6, 2013, Weise, et al.
Notice of Allowance dated Jun. 9, 2015, U.S. Appl. No. 14/099,763, filed Dec. 6, 2013, Weise, et al.

* cited by examiner

METHODS AND APPARATUSES OF MEASURING IMPULSE NOISE PARAMETERS IN MULTI-CARRIER COMMUNICATION SYSTEMS

RELATED APPLICATIONS

The present application claims the benefit of priority from and is related to the following commonly-owned U.S. provisional application: application Ser. No. 60/663,304, filed on Mar. 18, 2005.

TECHNICAL FIELD

The invention relates generally to communication system and, more particularly, to tracking the parameters of a source of periodic Impulse Noise in a communication system.

BACKGROUND

There are various types of interference and noise sources in a multi-carrier communication system, such as a Discrete Multiple Tone (DMT) system. Interference and noise may corrupt the data-bearing signal on a tone as the signal travels through the communication channel and is decoded at the receiver. The transmitted data-bearing signal may be decoded erroneously by the receiver because of this signal corruption. The number of data bits or the amount of information that a tone carries may vary from tone to tone and depends on the relative power of the data-bearing signal compared to the power of the corrupting signal on that particular tone.

In order to account for potential interference on the transmission line and to guarantee a reliable communication between the transmitter and receiver, each tone of a DMT system is typically designed to carry a limited number of data bits per unit time based on the tone's Signal to Noise Ratio (SNR) using a bit-loading algorithm, which is an algorithm to determine the number of bits per tone. The number of bits that a specific tone may carry decreases as the relative strength of the corrupting signal increases, that is when the SNR is low or the bit error rate (BER) is high. Thus, the SNR of a tone may be used to determine how much data should be transmitted by the tone at a target bit error rate.

It is often assumed that the corrupting signal is an additive random source with Gaussian distribution and white spectrum. With this assumption, the number of data bits that each tone can carry relates directly to the SNR. However, this assumption may not be true in many practical cases and there are various sources of interference that do not have a white, Gaussian distribution. Impulse noise is one such noise source. Bit-loading algorithms are usually designed based on the assumption of additive, white, Gaussian noise. With such algorithms, the effects of Impulse Noise can be underestimated resulting in an excessive rate of error.

Further, channel estimation procedures that can be designed to optimize performance in the presence of stationary impairments such as additive, white, Gaussian noise, but are often poor at estimating non-stationary or cyclo-stationary impairments, such as impulse noise. Consequently, a Digital Subscriber Line (DSL) modem training procedures are typically well suited to optimizing performance in the presence of additive, white, Gaussian noise, but leave the modem receivers relatively defenseless to impulse noise.

SUMMARY

A method and apparatus for measuring and tracking Impulse Noise parameters in a communication system are described. The method includes estimating one or more parameters of the impulse noise, the parameters including a period, an offset and duration of the impulse noise.

BRIEF DESCRIPTION OF THE DRAWINGS

One or more embodiments of the invention are illustrated by way of example and not limitation in the figures of the accompanying drawings, in which like references indicate similar elements and in which.

DETAILED DISCUSSION

In general, methods and apparatuses for tracking and measuring Impulse Noise parameters in a communication system are discussed. The methods described herein may be used to estimate parameters of impulse noise, such as period, offset and duration, adaptively.

In the following description, for purposes of explanation, numerous specific details are set forth in order to provide a thorough understanding of the invention. It will be evident, however, to one skilled in the art that the invention may be practiced without these specific details. In other instances, well-known circuits, structures, and techniques are not shown in detail or are shown in block diagram form in order to avoid unnecessarily obscuring an understanding of this description.

Impulse Noise can be a difficult impairment for DSL modems. Impulse noise with duration of tens of microseconds can cause errors in all the used tones at the receiver. Further, Impulse Noise can have power bursts that are much higher than the background noise level causing significant performance loss. These power bursts can have a very small duty cycle such that they do not contribute significantly to average noise power. This can result in aggressive bit loading on some or all tones in a DMT system, with an excessively high bit error rate.

Impulse noise is a corrupting signal that is typically considered to be hard to correct and compensate for. In many instances the dominant source of impulse is periodic. For instance, a DSL modem that picks up crosstalk from an electric dimmer light switch suffers from a periodic Impulse Noise with usually twice the frequency of the AC electric power. In such cases, there are a number of methods of protecting the modem against the periodic impulse noise. However, such methods usually require some information on the Impulse Noise characteristics, such as impulse period and duration. There is no known method for impulse parameter estimation for DSL systems.

Embodiments of the invention may relate to any communication system, and, in particular to a multi-carrier system, in which tracking the parameters of a source of periodic Impulse Noise can be beneficial. Examples of parameters of a periodic Impulse Noise source include: period, time offset and duration. Parameters of a periodic Impulse Noise source can be used to predict the future occurrences of Impulse Noise in time. More specifically, the communication channel is predicted to be corrupted by Impulse Noise starting at time offset O with periodic Impulse Noise of duration D and period P. Because the parameters of the Impulse Noise source may change in time, according to certain embodiments of the invention, the parameters are continuously measured, updated and tracked.

Figure 1:
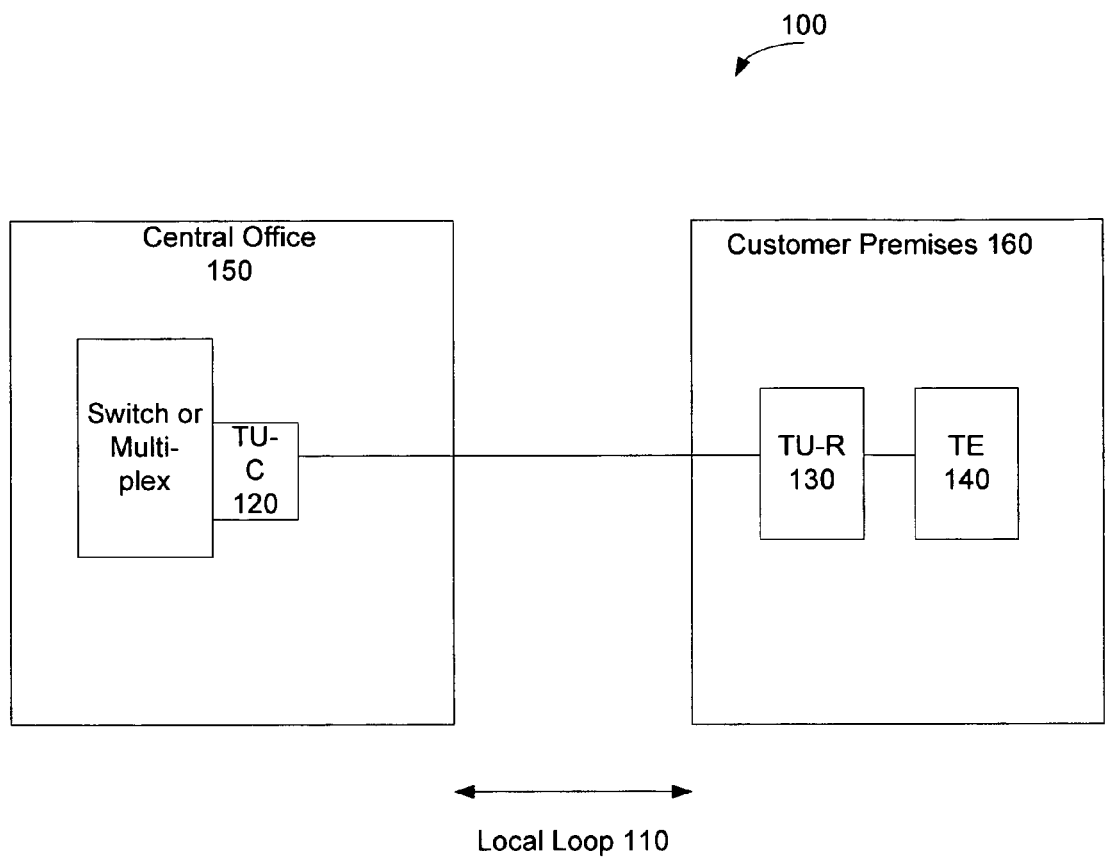
FIG. 1 illustrates a schematic diagram of an embodiment of a DSL system.

FIG. 1 shows a DSL system 100. The DSL system 100 consists of a local loop 110 (telephone line) with a transceiver (also known as a modem) at each end of the wires. The transceiver at the central office 150 of the line is called transmission unit at the central end (TU-C) 120. The TU-C 120 may reside within a DSL access multiplexer (DSLAM) or a digital loop carrier remote terminal (DLC-RT) for lines fed from a remote site. The transceiver at the customer premises 160 of the line is called transmission unit at the remote end (TU-R) 130. FIG. 1 also shows the terminal equipment (TE) 140, which is the end-user equipment, such as a personal computer or a telephone.

Figure 2:
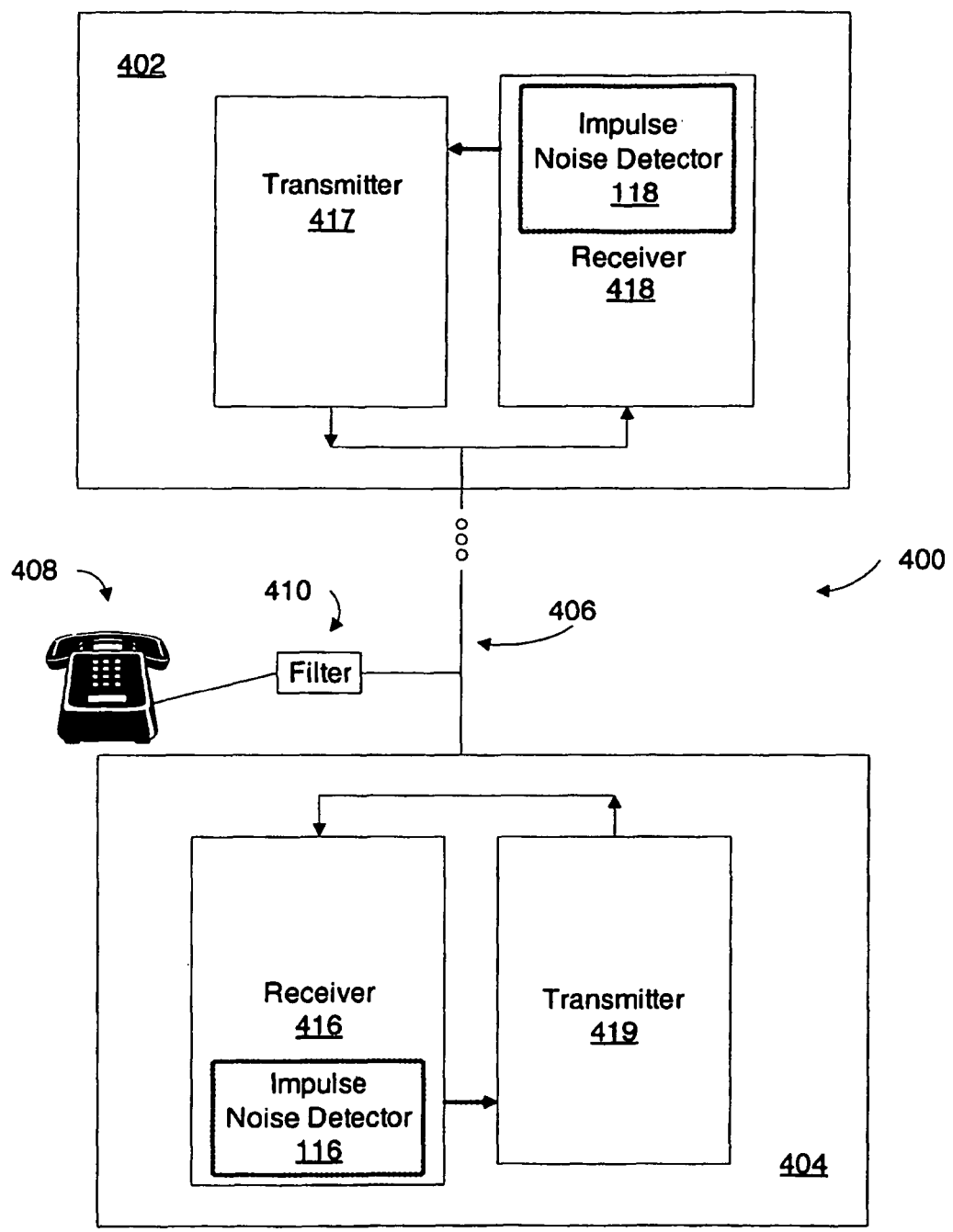
FIG. 2 illustrates a schematic diagram of a digital communication system in which an embodiment of the invention can be implemented.

FIG. 2 illustrates a block diagram of an embodiment of a discrete multiple tone system. The discrete multiple tone system 400, such as a Digital Subscriber Line (DSL) based network, may have two or more transceivers 402 and 404, such as a DSL modem in a set top box. In one embodiment, the set top box may be a stand-alone DSL modem. In one embodiment, for example, the set top box employs a DSL modem along with other media components to combine television (Internet Protocol TV or Satellite) with broadband content from the Internet to bring the airwaves and the Internet to an end user's TV set. The multiple carrier communication channel may communicate a signal to a residential home. The home may have a home network, such as an Ethernet. The home network may either use the multiple carrier communication signal, directly, or convert the data from the multiple carrier communication signal. The set top box may also include an integrated Satellite and Digital Television Receiver, High-Definition Digital Video Recorder, Digital Media Server and other components.

The first transceiver 402, such as a Discrete Multi-Tone transmitter, transmits and receives communication signals from the second transceiver 404 over a transmission medium 406, such as a telephone line. Other devices such as telephones 408 may also connect to this transmission medium 406. An isolating filter 410 generally exists between the telephone 408 and the transmission medium 406. A training period occurs when initially establishing communications between the first transceiver 402 and a second transceiver 404.

The discrete multiple tone system 400 may include a central office, multiple distribution points, and multiple end users. The central office may contain the first transceiver 402 that communicates with the second transceiver 404 at an end user's location.

Each transmitter portion 417, 419 of the transceivers 402, 404, respectively, may transmit data over a number of mutually independent sub-channels i.e., tones. Each sub-channel carries only a certain portion of data through a modulation scheme, such as Quadrature Amplitude Modulation (QAM) of the sub-carrier. The number of information bits loaded on each tone and the size of corresponding QAM constellation may potentially vary from one tone to another and depend generally on the relative power of signal and noise at the receiver. When the characteristics of signal and noise are known for all tones, a bit-loading algorithm may determine the optimal distribution of data bits and signal power amongst sub-channels. Thus, a transmitter portion 417, 419 of the transceivers 402, 404 modulates each sub-carrier with a data point in a QAM constellation.

Each transceiver 402, 404 also includes a receiver portion 418, 416 that contains hardware and/or software in the form of software and/or hardware to detect for the presence of Impulse Noise present in the communication channel. The impulse detector 116, 118 detects the presence of Impulse Noise in the communication channel over finite intervals of time called time frames (or simply frames). The impulsive frame numbers are fed to an Impulse Noise Tracking Module (not shown) to determine parameters of the Impulse Noise source.

Figure 3:
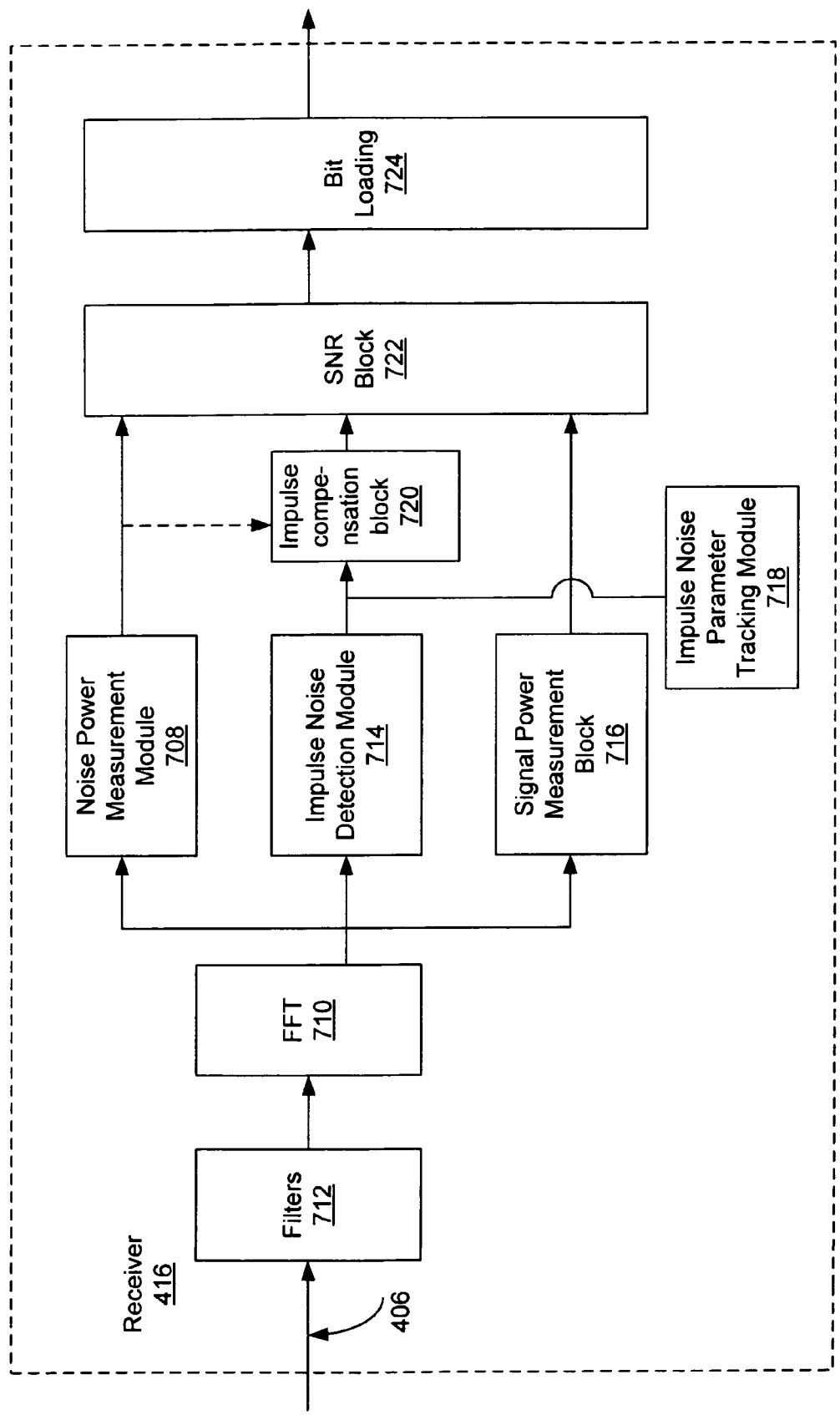
FIG. 3 illustrates a schematic diagram showing an embodiment of a receiver that measures and tracks Impulse Noise parameters.

FIG. 3 illustrates one embodiment of a receiver of FIG. 2. In this embodiment, receiver 416 may contain various modules such as a Fast Fourier Transform (FFT) module 710, filters 712, an Impulse Noise Detection module 714, an Impulse Noise parameter tracking module 718, a Noise Power Measurement module 708, a Signal Power Measurement module 716, a SNR module 722 and bit-loading module 724. Additional modules and functionality may exist in the receiver 416 that are not illustrated so as not to obscure an understanding of embodiments of the invention.

In the receiver 416, the data for each tone/sub-channel is typically extracted from the time-domain data by taking the Fourier transform of a block of samples from the multi-tone signal. The Fast Fourier Transform module 710 receives the output of a block of filters 712. The Fast Fourier Transform module 710 transforms the data samples of the multi-tone signal from the time-domain to the frequency-domain, such that a stream of data for each sub-carrier may be output from the Fast Fourier Transform module 710. Essentially, the Fast Fourier Transform module 710 acts as a demodulator to separate data corresponding to each tone in the multiple tone signals. In one embodiment, processing of each sub-carrier may be performed in parallel or in series. The Fast Fourier Transform module 710 may sample a sine and cosine of the amplitude of a tone over time to create the time domain data. The Fourier transform correlates the time domain data of the tone to the actual sine and cosine of the amplitude of the tone over time. The output of the FFT 710 is transmitted to signal power measurement module 716, Noise Power Measurement module 708, and Impulse Noise detector 714.

During a training session, for example, between the transceiver in a central office (e.g., transceiver 402) and the transceiver at an end user's location (e.g., transceiver 404), the transmitter portion (e.g., transmitter 417) of the transceiver in the central office transmits long sequences that include each of these data points. Over time, a large number of samples are collected for each potential data point.

The noise power measurement block 708 measures the amount of noise in a sub carrier signal. For each particular sub-carrier of the multi-carrier signal, the noise power measurement block 708 measures the power level of total noise for that sub-carrier. The noise power measurement block 708 includes a decoder module of expected transmitted data points. The noise power measurement block 708 measures noise present in the system by comparing the mean difference between the values of the received data to a finite set of expected data points that potentially could be received. The noise in the signal may be detected by determining the distance between the amplitude of the transmitted tone (at a given frequency and amplitude level) and the amplitude of the sine term and cosine term of the received tone to determine the magnitude of the error signal for that tone at that time. The noise present causes the error between the expected known value and the actual received value.

For each particular sub-carrier of the multi-carrier signal, the noise power measurement block 708 measures the power level of total noise for that sub-carrier. The noise power measurement block 708 generates a noise power measurement to be used in the SNR calculation and subsequent bit-loading algorithm for that tone.

The output of the FFT 710 is also transmitted to Impulse Noise detector 714. The Impulse Noise detector 714 detects frames that are affected by impulse noise. The Impulse Noise detector 714 triggers the Impulse Noise Tracking Module 718 to determine information about the impulse noise.

The receiver 416 may further include an impulse compensation block 720 to determine a gain factor associated with the impulse noise. The gain factor may be multiplied with a measured power level of noise for the sub-carrier to obtain an equivalent noise power. The equivalent noise power may be input into a Signal-to-Noise Ratio (SNR) block 722. In certain embodiments, the equivalent noise power calculation may include the noise power calculation made by noise power measurement block 708. The SNR block determines a signal-to-noise ratio, which is used to determine bit loading 724 for the sub-carrier.

The Signal Power Measurement module 716 measures the signal power for the sub-carrier, and inputs the result into the SNR module 722. The SNR module 722 determines a signal-to-noise ratio using the equivalent noise power provided by the impulse compensation block 720. The signal-to-noise ratio is provided to bit-loading module 724 to determine bit-loading for all sub-carriers. The bit rate for a tone determined by the bit-loading module may then be transmitted, using transmitter portion 419, to the transceiver 402 (e.g., at a central office) to enable the transmitter 417 of transceiver 402 to know how many bits to use on each tone.

It should be noted that the operations of one or more modules may be incorporated into or integrated with other modules. For example, detection of Impulse Noise may be performed by the Impulse Noise Tracking Module 718 rather than Impulse Noise detector 714 or the operations of both modules may be integrated into a single module.

Figure 4:
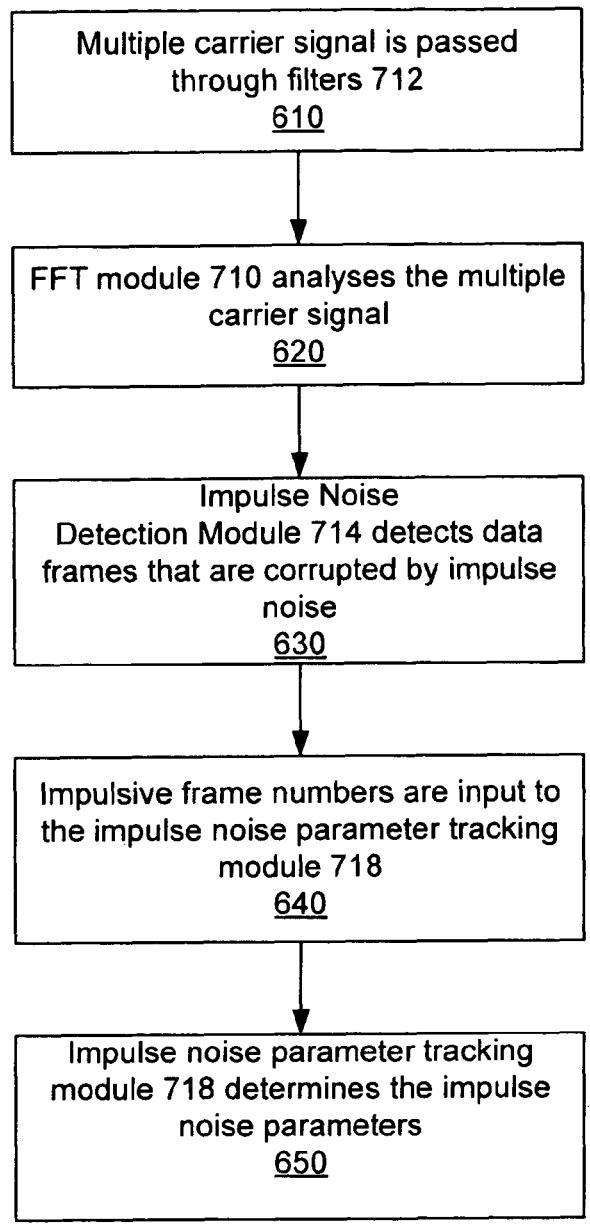
FIG. 4 illustrates a flowchart showing an embodiment of a method to measure and track Impulse Noise parameters.

FIG. 4 illustrates one embodiment of tracking Impulse Noise parameters present in a tone. At block 610, a multiple carrier signal is passed through filters 712. At block 620, the Fast Fourier Transform module 710 receives the output of a block of filters 712 and performs a windowing operation on the multi-tone signal. The FFT module 710 analyses the multiple carrier signals over a defined period time. The defined period of time containing the multiple carrier signals may be referred to as a window or frame of data. The Fast Fourier Transform module 710 transforms the data samples of the multi-tone signal from the time-domain to the frequency-domain, such that a stream of data for each sub-carrier may be output from the Fast Fourier Transform module 710 and input to the Impulse noise detector 714 at block 620. The Impulse noise detector 714 detects data frames that are corrupted by impulse noise at block 630. The impulsive frame numbers are input to the Impulse Noise parameter tracking module 718 at block 640. The Impulse Noise parameter tracking module 718 determines the Impulse Noise parameters, D, O and P, and tracks any variations in the parameter values at block 650.

Figure 5:
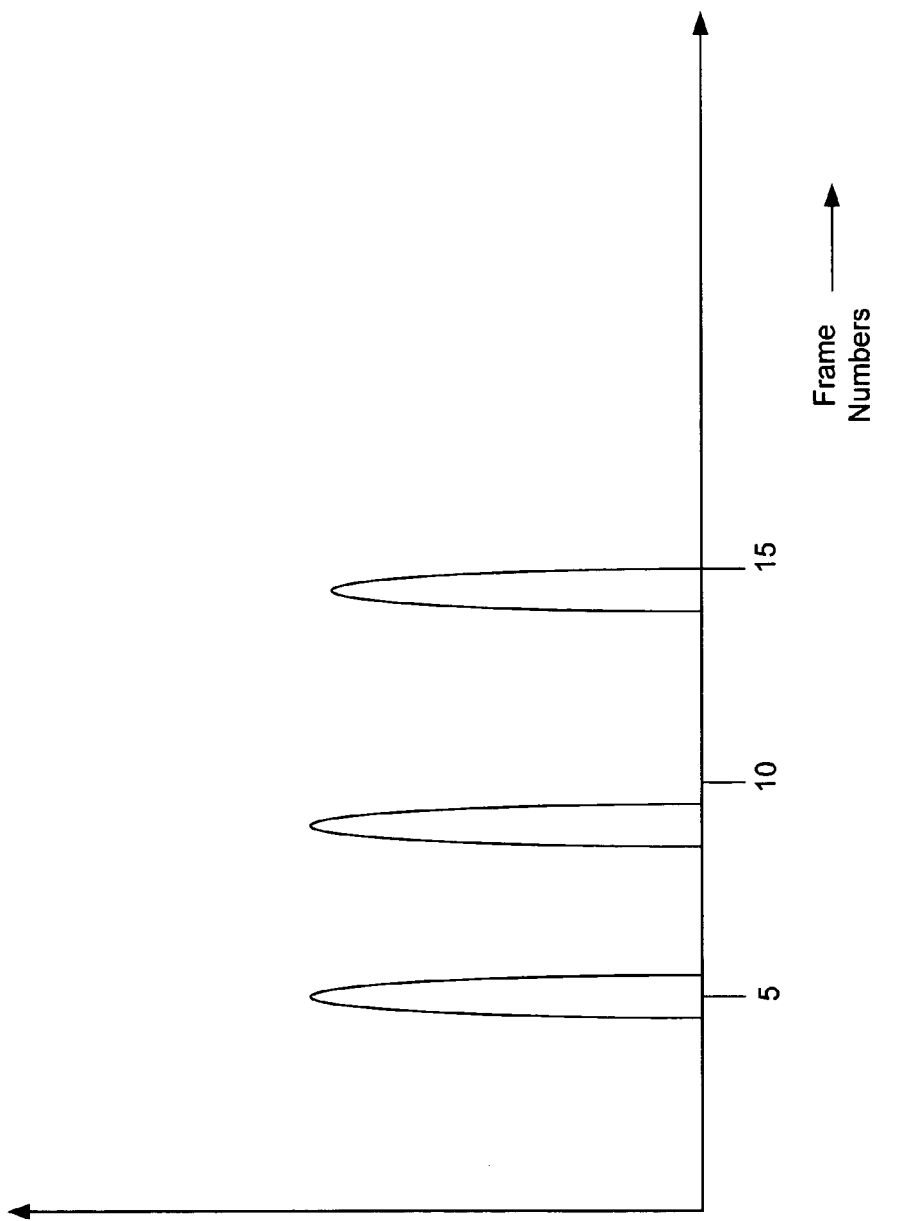
FIG. 5 illustrates Impulse Noise corrupting DMT frames.

FIG. 5 illustrates an example of periodic Impulse Noise corrupting frames in a DMT system. As shown in the example graph of FIG. 5, the offset is equal to 4 frames. As shown in FIG. 5, frame numbers 5, 9 and 14 are impulsive. The Impulse Noise at frame numbers 5 and 9 provides an instantaneous period of 4 frames, while the Impulse Noise at frame numbers 9 and 14 provides an instantaneous period of 5 frames. Thus, while instantaneous impulse period at frame number 9 is 4 frames, and instantaneous impulse period at frame number 14 is 5 frames, an average Impulse Noise period is 4.5 frames.

At the Impulse Noise Tracking Module 718, impulse duration (D) is determined. According to one embodiment of the invention, D is measured by averaging the number of consecutive impulse frames. The averaging is beneficial because the duration of the impulse may cover one frame or more than one frame. If $D_i$ represents the number of consecutive impulsive frames for the $i^{th}$ detected impulse, then the impulse duration is measured as the time average of $D_i$. This averaging can be done, for example, as follows:

$$D = \frac{1}{N}\sum_{j=0}^{N-1} D_{i-j} \qquad (1)$$

The value of an averaging window N may be chosen to reduce any effects of low resolution without losing any variations in the duration of impulse.

Figure 6:
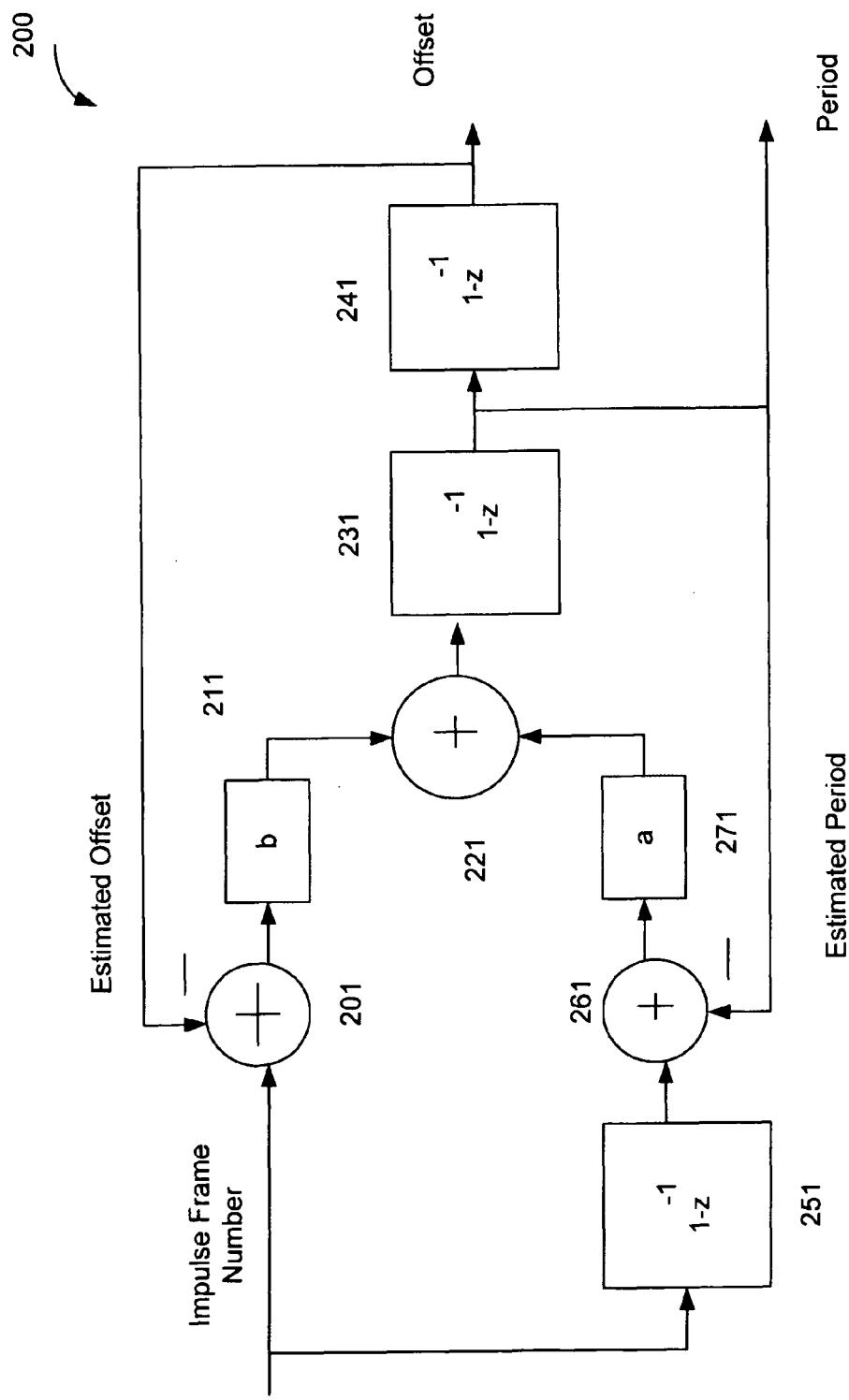
FIG. 6 illustrates a second order feedback loop 200 according to one embodiment of the invention.

To derive the time offset and period of the impulse noise, a second order feedback loop 200 similar to the one shown in FIG. 6 can also be used. The feedback loop 200 may be a component of the Impulse Noise parameter tracker 718. The input to the feedback loop 200 in FIG. 5 is the frame number of the first impulsive frame of each set of consecutive impulsive frames. The frame numbers may be provided by the Impulse Noise detector 714. The feedback loop 200 forces the error between an estimated offset and the real offset and the error between an estimated period and the real period to zero. The feedback loop 200 also tracks the variation in these parameters.

The summation module 201 subtracts the estimated time offset or frame number of impulse noise from the frame number of the current impulsive frame. The number represents the error between the estimated offset and the measured offset and is multiplied by constant "b" and supplied to summation module 221. The summation module 261 subtracts the estimated impulse period from the instantaneous impulse period calculated as the difference of consecutive impulsive frame numbers generated by block 251. The number at summation module 261 represents the error between the estimated period and the measured period. The error is multiplied by constant "a" at block 271 and supplied to summation module 221. The blocks 231 and 241 accumulate all the inputs and provide them as outputs. The output of block 231 is the estimated period, which continues to grow until the measurement and the estimated value match each other and the error between them is zero. The input to block 241 is the accumulated Impulse Noise period values. The output of block 231 is the estimated offset, which continues to grow until the measurement and the estimated value match each other and the error between them is zero. If the period is changing over time, then the offset also changes over time. The two parameters P and O interact with each other and the feedback loop 200 uses this information to determine the parameter values.

The parameters of this loop 200 "a" and "b" can be determined such that the tracking can happen as fast as possible without adding substantial noise to the estimated values. Generally, a small value of "a" and "b" allows lower estimation noise while larger values allow faster tracking of the parameters. The values "a" and "b" are constants that act as gain factors.

In an alternative embodiment, the time offset and period of the impulsive frames can also be estimated by using well-known algorithms such as minimum mean square error (MMSE) or least mean squares (LMS). In these algorithms, the history of the impulsive frame numbers is used to drive the power of estimation/prediction error to zero. This can be done adaptively, as in LMS algorithm, or in a block-by-block basis, as in MMSE algorithm.

The methods described herein may be embodied on a machine-accessible medium, for example, to perform Impulse Noise tracking. A machine-accessible medium includes any mechanism that provides (e.g., stores and/or transmits) information in a form accessible by a machine (e.g., a computer). For example, a machine-accessible medium includes read only memory (ROM); random access memory (RAM); magnetic disk storage media; optical storage media; flash memory devices; DVD's, electrical, optical, acoustical or other form of propagated signals (e.g., carrier waves, infrared signals, digital signals, EPROMs, EEPROMs, FLASH, magnetic or optical cards, or any type of media suitable for storing electronic instructions. The data representing the apparatuses and/or methods stored on the machine-accessible medium may be used to cause the machine to perform the methods described herein.

Although the Impulse Noise tracking methods have been shown in the form of a flow chart having separate blocks and arrows, the operations described in a single block do not necessarily constitute a process or function that is dependent on or independent of the other operations described in other blocks. Furthermore, the order in which the operations are described herein is merely illustrative, and not limiting, as to the order in which such operations may occur in alternate embodiments. For example, some of the operations described may occur in series, in parallel, or in an alternating and/or iterative manner.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term "coupled" as used herein may include both directly coupled and indirectly coupled through one or more intervening components.

While some specific embodiments of the invention have been shown the invention is not to be limited to these embodiments. The invention is to be understood as not limited by the specific embodiments described herein, but only by scope of the appended claims.

What is claimed is:

1. A method for estimation of impulse noise within frames of a multi-carrier system, each of the frames being characterized by a frame number from a plurality of frame numbers, the method comprising:
    detecting the frames of the multi-carrier system that are affected by the impulse noise;
    estimating one or more parameters of the impulse noise using the frame numbers of the frames that are affected by the impulse noise,
    wherein the one or more parameters of the impulse noise comprise a period, an offset, and a duration of the impulse noise; and
    predicting a position of future frames affected by the impulse noise using the one or more parameters of the impulse noise.

2. The method recited in claim 1, wherein the one or more parameters of the impulse noise are estimated using only the frame numbers of the frames that are affected by the impulse noise.

3. The method recited in claim 1, wherein estimating the one or more parameters comprises:
    averaging the frame numbers of the frames that are affected by the impulse noise.

4. The method recited in claim 3, wherein averaging the frame numbers comprises:
    evaluating the equation:

$$D = \frac{1}{N} \sum_{j=0}^{N-1} D_{i-j},$$

where $D_i$ represents a number of consecutive impulsive frames for an $i^{th}$ detected impulse, and N represents an averaging window.

5. The method recited in claim 1, wherein estimating the one or more parameters comprises:
    estimating the offset and the period of the impulse noise using a second order feedback loop.

6. The method recited in claim 5, wherein the feedback loop forces an error between an instantaneous period value and a previous period value to zero.

7. The method recited in claim 5, wherein the feedback loop forces an error between an instantaneous offset value and a previous offset value to zero.

8. The method recited in claim 1, wherein estimating the one or more parameters comprises:
    estimating the offset and the period of the impulse noise using one of a minimum mean square error algorithm or a least means square algorithm.

9. The method recited in claim 1, further comprising:
    determining a signal-to-noise ratio based upon the frames that are affected by the impulse noise; and
    performing bit-loading based on the signal-to-noise ratio.

10. An apparatus for estimation of impulse noise within frames of a multiple tone signal, each of the frames being characterized by a frame number from a plurality of frame numbers, comprising:
    a detector module configured to detect the frames of the multiple tone signal that are affected by the impulse noise, and
    an impulse noise parameter measurement module configured to estimate one or more parameters of the impulse noise using the frame numbers of the frames that are affected by the impulse noise,
    wherein the one or more parameters of the impulse noise comprise a period, an offset, and a duration of the impulse noise, and
    wherein the detector module is configured to predict a position of a future frame affected by the impulse noise using the one or more parameters of the impulse noise.

11. The apparatus recited in claim 10, wherein the impulse noise parameter measurement module is further configured to estimate the one or more parameters of the impulse noise using only frame numbers of the frames that are affected by the impulse noise.

12. The apparatus recited in claim 10, wherein the impulse noise parameter measurement module is configured to estimate the duration of impulse noise by averaging the frame numbers that are affected by the impulse noise.

13. The apparatus recited in claim 12, wherein the impulse noise parameter measurement module is further configured to average the frame numbers by evaluating the equation:

$$D = \frac{1}{N} \sum_{j=0}^{N-1} D_{i-j},$$

where $D_i$ represents a number of consecutive impulsive frames for an $i^{th}$ detected impulse, and N represents an averaging window.

14. The apparatus recited in claim 10, wherein the impulse noise parameter measurement module comprises:
   a feedback loop configured to estimate the offset and the period of the impulse noise.

15. The apparatus recited in claim 14, wherein the feedback loop is configured to force an error between an instantaneous period value and a previous period value to zero.

16. The apparatus recited in claim 14, wherein the feedback loop is configured to force an error between an instantaneous offset value and a previous offset value to zero.

17. The apparatus recited in claim 10, wherein the impulse noise parameter measurement module is configured to estimate the offset and the period of the impulse noise using one of a minimum mean square error algorithm or a least means square algorithm.

18. The apparatus recited in claim 10, further comprising:
   a signal-to-noise ratio module, coupled to the detector module, configured to determine a signal-to-noise ratio based on the frames that are affected by the impulse noise; and
   a bit-loading module, coupled to the signal-to-noise ratio module, configured to determine a bit rate based on the signal-to-noise ratio.

19. The apparatus recited in claim 10, wherein the multi-tone transceiver is implemented as part of a set top box employing a digital subscriber line modem.

* * * * *